United States Patent
Matsuo et al.

(10) Patent No.: US 6,785,453 B1
(45) Date of Patent: Aug. 31, 2004

(54) DISPERSION SHIFTED OPTICAL FIBER

(75) Inventors: Shoichiro Matsuo, Sakura (JP); Shoji Tanigawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 448 days.

(21) Appl. No.: 09/786,855

(22) PCT Filed: Jul. 11, 2000

(86) PCT No.: PCT/JP00/04620
§ 371 (c)(1),
(2), (4) Date: Mar. 9, 2001

(87) PCT Pub. No.: WO01/04675
PCT Pub. Date: Jan. 18, 2001

(30) Foreign Application Priority Data

Jul. 12, 1999 (JP) ............................................ 11-198242
Jul. 12, 1999 (JP) ............................................ 11-198243
Jul. 19, 1999 (JP) ............................................ 11-205450

(51) Int. Cl.$^7$ ................................................. G02B 6/26
(52) U.S. Cl. ........................ 385/123; 385/126; 385/127
(58) Field of Search ........................... 385/24, 122–123, 385/126–127

(56) References Cited

U.S. PATENT DOCUMENTS

| 5,559,921 A | 9/1996 | Terasawa et al. |
| 5,659,649 A | 8/1997 | Nouchi et al. |
| 5,675,688 A | 10/1997 | Nouchi et al. |
| 5,684,909 A | 11/1997 | Liu |
| 5,715,346 A | 2/1998 | Liu |
| 5,852,701 A | 12/1998 | Kato et al. |
| 5,963,700 A | 10/1999 | Kato et al. |
| 6,072,929 A | 6/2000 | Kato et al. |
| 6,084,993 A | 7/2000 | Mukasa |
| 6,181,858 B1 * | 1/2001 | Kato et al. .................. 385/123 |

FOREIGN PATENT DOCUMENTS

| AU | 718167 | 6/1999 |
| CA | 2225889 | 6/1998 |
| CA | 2229280 | 8/1998 |
| CA | 2246473 | 3/1999 |
| CN | 1186250 A | 7/1998 |
| EP | 0 689 068 A1 | 12/1995 |
| EP | 0 749 024 A2 | 12/1996 |

(List continued on next page.)

OTHER PUBLICATIONS

Masaaki, Hirano et al., "Teibunsan Slope Ring Core gata Bunsan Shift Fiber", Proceeding of 1998 general meeting, The Institute of Electronics, Information and Communication Engineers, Electronics 1, Mar. 6, 1998, p. 223.*

(List continued on next page.)

Primary Examiner—Frank G. Font
Assistant Examiner—Michael P. Mooney
(74) Attorney, Agent, or Firm—Bell Boyd & Lloyd LLC (57) ABSTRACT

A dispersion shifted optical fiber comprising a core and cladding provided at an outer periphery of the core, and having a refractive index profile in which the core is provided with a central core portion and a peripheral core portion having a higher refractive index than the central core portion provided at an outer periphery of the central core portion, and the cladding has a lower refractive index than the peripheral core portion, wherein, by appropriately setting the structural parameters, it is possible to provide a dispersion shifted optical fiber that is essentially single mode and is capable of fulfilling the condition of a bending loss of 100 dB/m or less, and that also provides a sufficient increase in the effective core area and a reduction in the dispersion slope.

11 Claims, 4 Drawing Sheets

FOREIGN PATENT DOCUMENTS

| | | |
|---|---|---|
| EP | 0 779 524 A2 | 6/1997 |
| EP | 0 789 257 A1 | 8/1997 |
| EP | 0 851 245 A2 | 7/1998 |
| EP | 0 859 247 A2 | 8/1998 |
| EP | 0 862 069 A2 | 9/1998 |
| EP | 0 959 374 A1 | 11/1999 |
| FR | 2 768 233 | 3/1999 |
| GB | 2 331 162 A | 5/1999 |
| JP | 1-169410 | 7/1989 |
| JP | 1-224706 | 9/1989 |
| JP | 6-11620 | 1/1994 |
| JP | 8-5855 | 1/1996 |
| JP | 8-160241 | 6/1996 |
| JP | 8-220362 | 8/1996 |
| JP | 9-218318 | 8/1997 |
| JP | 9-274118 | 10/1997 |
| JP | 9-281354 | 10/1997 |
| JP | 9-288220 | 11/1997 |
| JP | 10-062640 | 3/1998 |
| JP | 10-239550 | 9/1998 |
| JP | 10-246830 * | 9/1998 ............ G02B/6/22 |
| JP | 10-293225 | 11/1998 |
| JP | 10-300966 | 11/1998 |
| JP | 11-72640 | 3/1999 |
| JP | 11-84158 | 3/1999 |
| JP | 11-119045 | 4/1999 |
| JP | 11-119046 | 4/1999 |
| JP | 11-167038 * | 6/1999 ............ G02B/6/16 |
| JP | 11-506228 | 6/1999 |
| JP | 11-218633 | 8/1999 |
| JP | 11-223741 | 8/1999 |
| JP | 2000-221352 | 8/2000 |
| WO | WO 96/07942 | 3/1996 |
| WO | WO 97/33188 | 9/1997 |
| WO | WO 99/30193 | 6/1999 |
| WO | WO 00/31573 | 6/2000 |
| WO | WO 00/52507 | 9/2000 |

OTHER PUBLICATIONS

Bhagavatula, V.A. et al., "Dispersion–shifted single–mode fiber for high–bit–rate and multiwavelength system," OFC '95 Technical Digest, (1995), pp 259–260.

Nouchi, P. et al., "New Dispersion Shifted Fiber With Effective Area Larger Than 90 m ," 22nd European Conference on Optical Communication, Sep. 15–19, 1996, MoB.3.2, pp1.49–1.52.

Himeno, K. et al., "Splice Loss of Large Effective Area Fiber and Its Reduction by Mode Field Conversion," ECOC 97, Sep. 22–25, 1997, Conference Publication No. 448, pp 131–134.

Nouchi, P., "Maximum effective area for non–zero dispersion–shifted fiber," OFC '98 Technical Digest, pp 303–304.

Hirano, M. et al., "Ring–Core Type Dispersion Shifted Fiber with Low Dispersion Slope," Proceedings of the 1998 IEICE General Conference, Mar. 27–30, 1998, p 223.

Liu, Y. et al., "Single–Mode Dispersion–Shifted Fibers with Effective Area Over 100 $\mu m^2$," ECOC '98, Sep. 20–24, 1998, p 41–42.

Belov, A.V., "Profile structure of single–mode fibers with low nonlinear properties for long–haul communication lines," Optics Communications, 161 (1999) pp 212–216.

Kato, T, et al., "Low nonlinearity disperison–shifted fibers employing dual–shaped core profile with depressed cladding," OFC '97 Technical Digest, p. 66.

Namihira, Y. et al., "Large Effective Area Dispersion Shifted Fibers with Depressed Cladding for WDM Transmission," APCC/OECC '99 Conference, Oct. 18–22, 1999, pp. 1557–1580.

Namihira, Y. et al., "Low Nonlinear Optical Fibers for WDM Transmission, "Technical research report of the Institute of Electronics, Information and Communication Engineers, May 1999, vol. 99, No. 90 (OCS99–19), pp. 61–66.

Kato, T. et al., "Dispersion Shifted Fiber for WDM Transmission, "Technical research report of the Institute of Electronics, Information and Communication Engineers, Nov. 1996, vol. 96, No. 339 (OCS96–58), pp. 43–48.

* cited by examiner

DISPERSION SHIFTED OPTICAL FIBER

TECHNICAL FIELD

The present invention relates to a dispersion shifted optical fiber designed so that the chromatic dispersion value in a 1.55 μm wavelength band where the loss of quartz based optical fiber is the smallest is substantially zero, and particularly to a dispersion shifted optical fiber having a large effective core area and a small dispersion slope

BACKGROUND ART

Conventionally, in a long distance system such as an optical amplification relay transmission system etc. that uses an optical fiber amplifier, in order to suppress deterioration in the transmission characteristics, it is vital that non-linear optical effects be reduced.

The size of the non-linear effect is represented by n2/Aeff. Here, n2 is the non-linear refractive index of an optical fiber and Aeff is the effective core area of the optical fiber. Accordingly, in order to reduce the non-linear effect, it is necessary to either reduce n2 or to increase the effective core area. However, because the value of n2 does not change greatly once the material thereof has been decided, the more effective method is to expand the effective core area for reducing the non-linear optical effect.

In a wavelength multiplex transmission system that is capable of large volume transmission, however, in order to transmit a plurality of optical signals having different wavelengths using a single dispersion shifted optical fiber (i.e. as a transmission path), there are increased demands for a reduction in the dispersion slope. The dispersion slope shows the wavelength dependency of the chromatic dispersion values and is a gradient of the curve when the chromatic dispersion values are plotted when the horizontal axis is set as the wavelength (nm) and the vertical axis is set as the chromatic dispersion values (ps/km·nm).

The larger the dispersion slope of the dispersion shifted optical fiber, the larger the difference in the chromatic dispersion value between a plurality of wavelengths transmitted along one dispersion shifted optical fiber, the more irregular the transmission state, and the more the transmission characteristics are deteriorated. A large dispersion slope is therefore undesirable.

Further, the minimum conditions required for a transmission path for an optical communication system are that it is single mode essentially and that bending loss be held to 100 dB/m or less.

Therefore, recently, proposals intended to achieve a reduction in the dispersion slope and an enlargement in the effective core area using various refractive index distribution configurations (refractive index profiles) have been made in, for example, Japanese Patent Unexamined Application (JP-A) Nos. 10-293225, 10-239550, 11-119046, and the like.

FIGS. 5(a) to 5(d) show examples of the refractive index profile of such dispersion shifted optical fibers.

Figure 5:
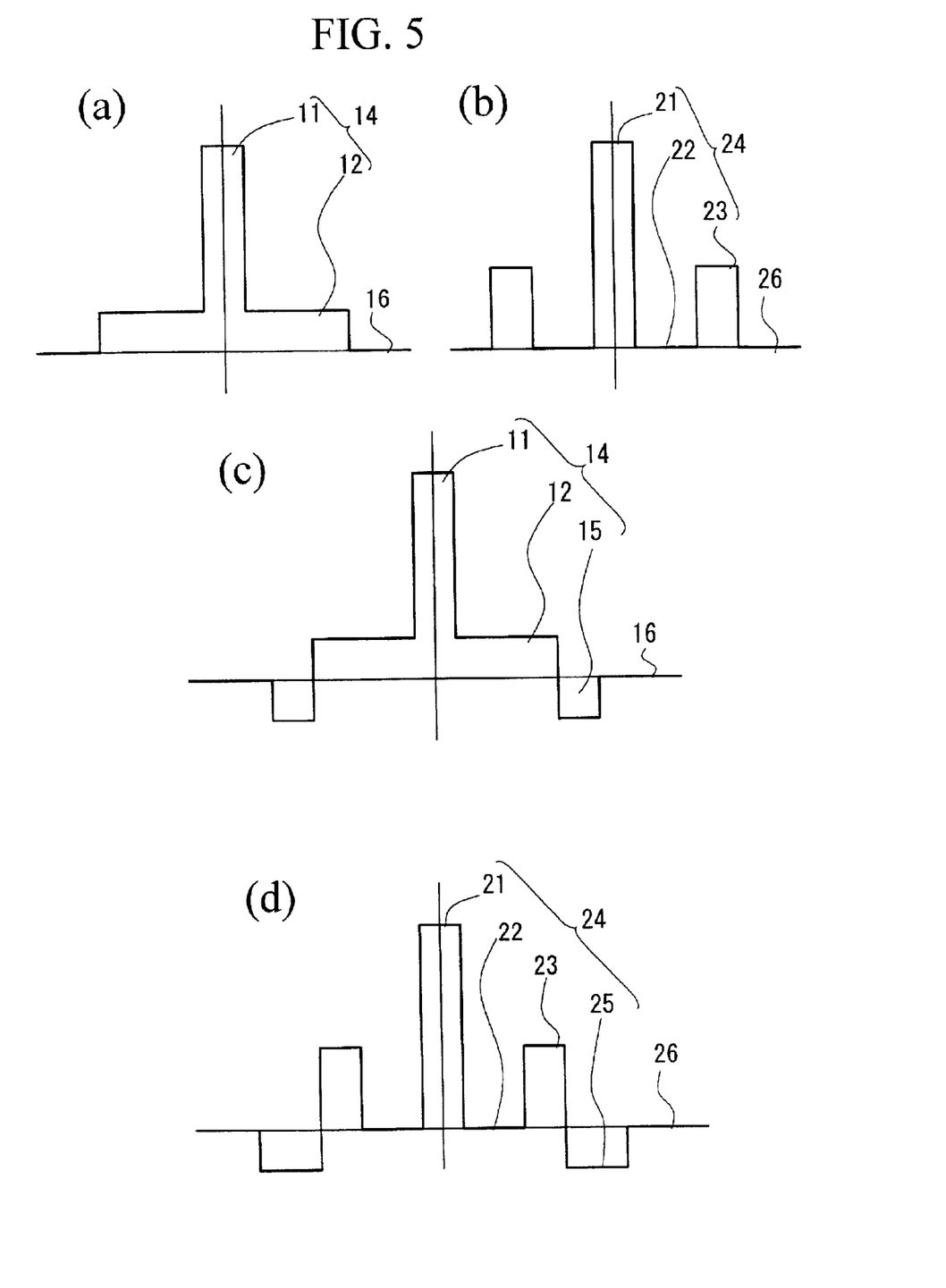
FIGS. 5(a) to 5(d) are views showing examples of refractive index profiles of a conventional dispersion shifted optical fiber.

FIG. 5(a) shows an example of a step type (dual shape core type) of refractive index profile. A core 14 is formed provided with a central core portion 11 and a step core portion 12 provided at the outer periphery of the central core portion 11 and having a lower refractive index than the central core portion 11. In addition, cladding 16 having a lower refractive index than the step core portion 12 is provided at the outer periphery of the core 14.

FIG. 5(b) shows an example of a segment core type of refractive index profile. A core 24 is formed provided with a central core portion 21 having a high refractive index and an intermediate portion 22 having a low refractive index at the outer periphery of the central core portion 21. A ring core portion 23 having a lower refractive index than the central core portion 21 and a higher refractive index than the intermediate portion 22 is further provided at the outer periphery of the intermediate portion 22. In addition, cladding 26 having a refractive index equal to the intermediate portion 22 is provided at the outer periphery of the ring core portion 23.

FIG. 5(c) is a variant example of the step type refractive index profile shown in FIG. 5(a). A core 14 is formed with a low refractive index portion 15, which has a lower refractive index than the cladding 16, provided between the step core portion 12 and the cladding 16.

FIG. 5(d) is a variant example of the segment core type refractive index profile shown in FIG. 5(b). A core 24 is formed with a low refractive index portion 25, which has a lower refractive index than the cladding 26, provided between the ring core portion 23 and the cladding 26.

However, in conventionally proposed dispersion shifted optical fibers under the preconditions that essentially the transmission path be single mode and that bending loss be held to 100 dB/m or less, it has been difficult to achieve both an enlargement in the effective core area and a reduction in the dispersion slope.

For example, in the examples having the refractive index profiles shown in FIGS. 5(a) to 5(d), if an attempt is made to increase the effective core area by 90 μm² or more it is not possible to be dispersion slope enough small.

The present invention was conceived in view of the above and it is an object thereof to provide a dispersion shifted optical fiber that fulfills the conditions of being essentially single mode and having bending loss of less than 100 dB/m, and also enables sufficient enlargement of the effective core area and sufficient reduction of the dispersion slope to be achieved.

DISCLOSURE OF INVENTION

In order to achieve the above objects, the first aspect of the present invention is a dispersion shifted optical fiber comprising a core and cladding provided at an outer periphery of the core, and having a refractive index profile in which the core is provided with a central core portion and a peripheral core portion having a higher refractive index than the central core portion provided at an outer periphery of the central core portion, and the cladding has a lower refractive index than the peripheral core portion, wherein, in a used wavelength band selected from 1490 to 1625 nm, the dispersion shifted optical fiber has an effective core area of 45 to 130 μm², a chromatic dispersion value of −8 to +8 ps/km/nm, a dispersion slope of 0.12 ps/km/nm² or less, a bending loss of 100 dB/m or less, and a cutoff wavelength that provides essentially single mode propagation.

The second aspect of the present invention is the dispersion shifted optical fiber according to the first aspect, wherein a core comprises a central core portion and a peripheral core portion, and if Δ1 is a relative refractive index difference of the central core when the refractive index of the cladding is taken as a reference, and Δ2 is a relative refractive index difference of the peripheral core portion when the refractive index of the cladding is taken as the reference, and r1 is a radius of the central core portion and r2 is a radius of the peripheral core portion, then the following conditions a to d are fulfilled:

a: $1.35\% \leq (\Delta 2 - \Delta 1)$ b: $1.2 \leq r2/r1 \leq 2.0$ c: $\Delta 2 \geq 0.8\%$ and $1.8 \leq \Delta 2 \times (r2/r1)^2 \leq 3.5$ d: When the larger one from out of 0.8 or $1.8/(r2/r1)^2$ is set as $\Delta 2$ min, and a ring inner volume is set as $-\Delta 1 \times r1^2$, and a ring outer volume is set as $\Delta 2$ min$\times (r2^2 - r1^2)$, then the ring outer volume/ring inner volume is either 2 or more, or 0 or less.

The third aspect of the present invention is the dispersion shifted optical fiber according to the second aspect, wherein, in a used wavelength band selected from 1490 to 1625 nm, the dispersion shifted optical fiber has an effective core area of 75 to 130 $\mu m^2$, a chromatic dispersion value of −6 to +6 ps/km/nm, a dispersion slope of 0.12 ps/km/nm$^2$ or less, a bending loss of 100 dB/m or less, and a cutoff wavelength that provides essentially single mode propagation.

The fourth aspect of the present invention is the dispersion shifted optical fiber according to the second aspect, wherein b and c are within the numerical ranges given below:

b: $1.2 \leq r2/r1 \leq 1.9$ c: $\Delta 2 \geq 0.8\%$ and $1.8 \leq \Delta 2 \times (r2/r1)^2 \leq 3.2$.

The fifth aspect of the present invention is the dispersion shifted optical fiber according to the fourth aspect, wherein the effective core area is 85 to 130 $\mu m^2$.

The sixth aspect of the present invention is the dispersion shifted optical fiber according to the second aspect, wherein b and c are within the numerical ranges given below:

b: $1.2 \leq r2/r1 \leq 1.8$ c: $\Delta 2 \geq 0.8\%$ and $1.8 \leq \Delta 2 \times (r2/r1)^2 \leq 2.7$.

The seventh aspect of the present invention is the dispersion shifted optical fiber according to the sixth aspect, wherein the effective core area is 95 to 130 $\mu m^2$.

The eighth aspect of the present invention is the dispersion shifted optical fiber according to the second aspect, wherein r2/r1 is 1.3 or more and $\Delta 1$ is 0% or less.

The ninth aspect of the present invention is the dispersion shifted optical fiber according to the eighth aspect, wherein the dispersion slope is 0.10 ps/km/nm$^2$ or less.

The tenth aspect of the present invention is the dispersion shifted optical fiber according to the first aspect, wherein the core comprises a central core portion and a peripheral core portion, and in a used wavelength band selected from 1490 to 1625 nm, the dispersion shifted optical fiber has an effective core area of 45 to 70 $\mu m^2$, a chromatic dispersion value of −6 to +6 ps/km/nm, a dispersion slope of 0.05 to 0.08 ps/km/nm$^2$, a bending loss of 100 dB/m or less, and a cutoff wavelength that provides essentially single mode propagation.

The eleventh aspect of the present invention is the dispersion shifted optical fiber according to tenth aspect, wherein, if $\Delta 1$ is a relative refractive index difference of the central core when the refractive index of the cladding is taken as a reference, and $\Delta 2$ is a relative refractive index difference of the peripheral core portion when the refractive index of the cladding is taken as the reference, and r1 is a radius of the central core portion and r2 is a radius of the peripheral core portion, then $\Delta 1$ is −0.3 to +0.3%, $\Delta 2$ is 0.8% or more, and r2/r1 is 1.4 to 2.5.

The twelfth aspect of the present invention is the dispersion shifted optical fiber according to the tenth aspect, wherein $\Delta 1$ is 0%.

The thirteenth aspect of the present invention is the dispersion shifted optical fiber according to the first aspect, wherein the core comprises a peripheral core portion, a second ring portion, and a third ring portion provided in that order on the central core portion and when the relative refractive index difference and radius of the central core portion, the peripheral core portion, the second ring portion, and the third core portion are set respectively as ($\Delta 1$, r1), ($\Delta 2$, r2), ($\Delta 3$, r3), and ($\Delta 4$, r4) when the cladding is taken as a reference, then the dispersion shifted optical fiber has a refractive index profile in which $\Delta 1$ and $\Delta 3$ are set as negative values, $\Delta 2$ is set as a positive value, and $\Delta 4$ is set as 0 or more, and in a used wavelength band selected from 1490 to 1625 nm, the dispersion shifted optical fiber has an effective core area of 45 to 120 $\mu m^2$, a dispersion slope of 0.03 to 0.10 ps/km/nm$^2$, a chromatic dispersion absolute value of 0.5 to 8 ps/km/nm, a bending loss of 100 dB/m or less, and a cutoff wavelength that provides essentially single mode propagation.

The fourteenth aspect of the present invention is the dispersion shifted optical fiber according to the thirteenth aspect, wherein the dispersion shifted optical fiber has an effective core area of 50 to 75 $\mu m^2$ and a dispersion slope of 0.03 to 0.06 ps/km/nm$^2$.

The fifteenth aspect of the present invention is the dispersion shifted optical fiber according to the fourteenth aspect, wherein the chromatic dispersion value is a negative value and $-0.50\% \leq \Delta 1 \leq -0.25\%$, $0.65\% \leq \Delta 2 \leq 0.85\%$, $-0.50\% \leq \Delta 3 \leq -0.25\%$, $0.0\% \leq \Delta 4 \leq 0.30\%$, $1.5 \leq r2/r1 \leq 2.5$, $1.5 \leq (r3-r2)/r1 \leq 2.5$, $0.5 \leq (r4-r3)/r2 \leq 2.0$.

The sixteenth aspect of the present invention is the dispersion shifted optical fiber according to the fourteenth aspect, wherein the chromatic dispersion value is a positive value and $-0.5\% \leq \Delta 1 \leq -0.05\%$, $0.75\% \leq \Delta 2 \leq 0.85\%$, $-0.50\% \leq \Delta 3 \leq -0.15\%$, $0.0\% \leq \Delta 4 \leq 0.3\%$, $1.5 \leq r2/r1 \leq 2.5$, $1.5 \leq (r3-r2)/r1 \leq 2.5$, $0.5 \leq (r4-r3)/r2 \leq 2.0$.

The seventeenth aspect of the present invention is the dispersion shifted optical fiber according to the thirteenth aspect, wherein the dispersion shifted optical fiber has an effective core area of 75 to 100 $\mu m^2$ and a dispersion slope of 0.06 to 0.09 ps/km/nm$^2$.

The eighteenth aspect of the present invention is the dispersion shifted optical fiber according to the seventeenth aspect, wherein the chromatic dispersion value is a negative value and $-0.50\% \leq \Delta 1 \leq -0.20\%$, $0.65\% \leq \Delta 2 \leq 0.85\%$, $-0.50\% \leq \Delta 3 \leq -0.25\%$, $0.0\% \leq \Delta 4 \leq 0.30\%$, $1.3 \leq r2/r1 \leq 2.5$, $0.5 \leq (r3-r2)/r1 \leq 1.5$, $0.5 \leq (r4-r3)/r2 \leq 2.0$.

The nineteenth aspect of the present invention is the dispersion shifted optical fiber according to the seventeenth aspect, wherein the chromatic dispersion value is a positive value and $-0.50\% \leq \Delta 1 \leq -0.05\%$, $0.65\% \leq \Delta 2 \leq 0.85\%$, $-0.50\% \leq \Delta 3 \leq -0.15\%$, $0.0\% \leq \Delta 4 \leq 0.30\%$, $1.3 \leq r2/r1 \leq 3.0$, $0.5 \leq (r3-r2)/r1 \leq 2.5$, $0.5 \leq (r4-r3)/r2 \leq 2.0$.

The twentieth aspect of the present invention is the dispersion shifted optical fiber according to the thirteenth aspect, wherein the dispersion shifted optical fiber has an effective core area of 100 to 120 $\mu m^2$ and a dispersion slope of 0.08 to 0.10 ps/km/nm$^2$.

The twenty first aspect of the present invention is the dispersion shifted optical fiber according to the twentieth aspect, wherein the chromatic dispersion value is a positive value and $-0.50\% \leq \Delta 1 \leq -0.25\%$, $0.65\% \leq \Delta 2 \leq 0.75\%$, $-0.50\% \leq \Delta 3 \leq -0.25\%$, $0.0\% \leq \Delta 4 \leq 0.30\%$, $1.3 \leq r2/r1 \leq 2.5$, $0.5 \leq (r3-r2)/r1 \leq 1.5$, $0.5 \leq (r4-r3)/r2 \leq 2.0$.

BEST MODE FOR CARRYING OUT THE INVENTION

The dispersion shifted optical fiber of the present invention comprises a core and cladding provided at the outer periphery of the core and has the following refractive index profile. Namely, the core is provided at least with a central core portion and a peripheral core portion provided at the outer periphery of the central core portion and provided with a refractive index higher than that of the central core portion. The cladding has a refractive index lower than that of the peripheral core portion.

By adjusting the structural parameters, in the used wavelength band that is selected from between 1490 to 1625 nm, it is possible for a dispersion shifted optical fiber to be obtained in which the effective core area is between 45 to 130 $\mu m^2$, the chromatic dispersion value is between −8 to +8 ps/km/nm, the dispersion slope is 0.12 ps/mk/nm$^2$ or less, the bending loss is 100 dB/m or less, and has a cutoff wavelength that is essentially single mode propagation.

In the used wavelength band of the dispersion shifted optical fiber of the present invention, a wavelength band having a suitable wavelength width is selected from a range of between 1490 to 1625 nm and more commonly between 1490 to 1610 nm. For example, a wavelength band having a predetermined wavelength width such as in a range of between 1500 to 1570 nm or 1530 to 1565 nm is selected depending on the amplification used wavelength band by the optical fiber amplifier used in the optical communication system. Alternatively, it is possible to select a wavelength band from the range of 1570 to 1625 nm, for example, having a predetermined wavelength width such as, for example, 1585 to 1625 nm, or 1585 to 1610 nm, or the like.

The present invention will now be described in detail using the first to third embodiments as examples.

(First Embodiment)

Figure 1:
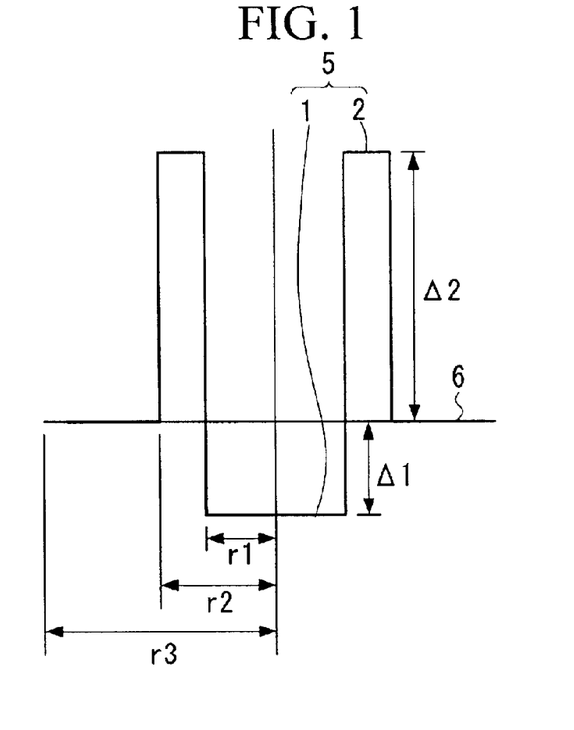
FIG. 1 is a view showing an example of the refractive index profile of the dispersion shifted optical fiber of the present invention.

FIG. 1 shows the refractive index profile of the dispersion shifted optical fiber of the first embodiment. A two layer structure core 5 is formed provided with a central core portion 1 in the center and a peripheral core portion 2 provided at the outer periphery of the central core portion 1 and having a higher refractive index than that of the central core portion 1. At the outer periphery of the core 5 there is provided cladding 6 having a refractive index lower than that of the peripheral core portion 2. Namely, including the cladding 6, a three layer structure refractive index profile is formed.

In this dispersion shifted optical fiber, for example, the central core portion 1 is formed from either quartz glass to which fluorine having the function of reducing the refractive index has been doped, or from quartz glass to which germanium having the function of increasing the refractive index has been doped, or from pure quartz glass. The peripheral core 2 is formed from quartz glass to which germanium has been doped, while the cladding 6 is formed from pure quartz glass.

In FIG. 1, Δ1 is the relative refractive index difference of the central core 1 when the refractive index of the cladding 6 is taken as the reference, while Δ2 is the relative refractive index difference of the peripheral core portion 2 when the refractive index of the cladding 6 is taken as the reference. r1 is the radius of the central core portion 1, while r2 is the radius of the peripheral core portion 2.

In the dispersion shifted optical fiber of the present embodiment, it is necessary to fulfill the following conditions a to d.

a. 1.35% ≦ (Δ2−Δ1)
b. 1.2 ≦ r2/r1 ≦ 2.0
c. Δ2 ≧ 0.8% and 1.8 ≦ Δ2×(r2/r1)$^2$ ≦ 3.5
d. When the larger one from out of 0.8 or 1.8/(r2/r1)$^2$ is set as Δ2 min, and the ring inner volume is set as −Δ1×r1$^2$, and the ring outer volume is set as Δ2 min×(r2$^2$−r1$^2$), then the ring outer volume/ring inner volume is either 2 or more, or 0 or less.

In the used wavelength band, the condition a above is set essentially so as to contribute to the guaranteeing of single mode propagation essentially. Here, if the above conditions a and d are met, Δ1 can be set as either a negative value (when the refractive index is lower than that of the cladding 6), zero (when the refractive index is equal to that of the cladding 6), or as a positive value (when the refractive index is higher than that of the cladding 6).

If the above condition b is not met, it is not possible to simultaneously fulfill all the conditions such as the effective core area, the dispersion slope, the bending loss, the cutoff wavelength, and the like that are described below.

By setting Δ2×(r2/r1)$^2$ to 3.5 or less in the above condition c, it is possible to achieve an increase in the effective core area. Setting Δ2×(r2/r1)$^2$ to 1.8 or more, contributes to guaranteeing single mode propagation essentially in the used wavelength band and also contributes to limiting the bending loss to 100 dB/m or less. There are also cases in which it contributes to only one of the guaranteeing of the single mode propagation and the limiting of the bending loss to 100 dB/m or less.

Moreover, if Δ2 is set at less than 0.8%, it is not possible to obtain the essential effect obtained by providing the peripheral core portion 2.

In the above condition d, Δ2 min is a value determined by the set value r2/r1 and corresponds to the lowest value of the range of numbers of Δ2 that fulfill the condition c. Δ2 min is selected from the largest one out of 0.8% and the value obtained by substituting the set value r2/r1 for 1.8/(r2/r1)$^2$.

The condition d contributes to the limiting of the bending loss to 100 dB/m or less.

When the ring inner volume/ring outer volume is 0 or less, Δ1 is a positive value, therefore, it is possible to make the bending loss 100 dB/m or less. If, however, Δ1 is a negative value, then if the ring inner volume/ring outer volume is 2 or more, it is possible to make the bending loss 100 dB/m or less.

Figure 2:
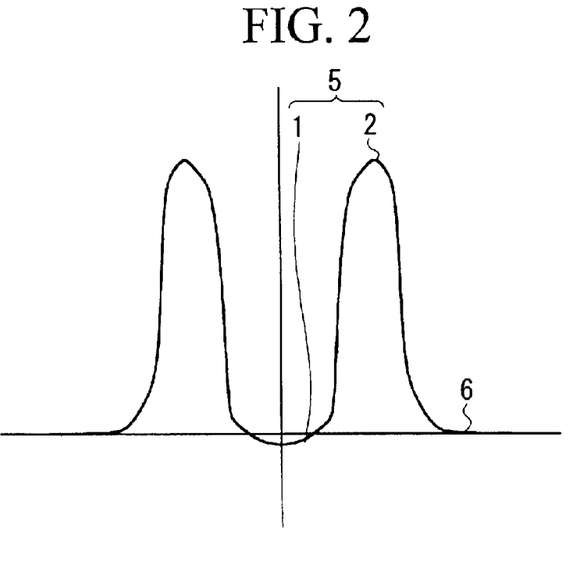
FIG. 2 is a view showing an example of the refractive index profile when the dispersion shifted optical fiber of the present invention is actually manufactured.

It is sufficient in the refractive index profile of an actual dispersion shifted optical fiber if the above conditions are met essentially. For example, in the refractive index profile of an actual dispersion shifted optical fiber, the boundaries of each layer (i.e. the central core portion 1, the peripheral core portion 2, and the cladding 6) may not be distinct as is shown in FIG. 1, but may be in a rounded state in which what is known as "sagging" is generated, as is shown in FIG. 2.

Moreover, it is also possible, for example, for there to be so-called "fluctuation" in the refractive index profile of the peripheral core portion 2 (Δ2).

The diameter of the cladding 6 is normally approximately 125 $\mu m$ and r2 is adjusted such that the chromatic dispersion value reaches the target value. Generally, r2 is between 2 to 10 $\mu m$.

In the present embodiment, by setting the four structural parameters of Δ1, Δ2, r1, and r2 which satisfy the above conditions a to d, it is possible to provide a dispersion shifted optical fiber having the effective core area, chromatic dispersion value, dispersion slope, bending loss, and cutoff wavelength shown below in the used wavelength band.

The effective core area is determined from the formula below.

$$Aeff = \frac{2\pi \left\{ \int_0^\infty a|E(a)|^2 da \right\}^2}{\int_0^\infty a|E(a)|^4 da}$$

wherein, a: the core radius, E(a): the field intensity at the radius a

In the present embodiment, it is possible to obtain an effective core area of 75 to 130 $\mu m^2$ in the used wavelength band. In the present embodiment, there are cases when an effective core area of less than 75 $\mu m^2$ is insufficient from the viewpoint of reducing non-linear effects in extreme long distance paths such as in the Trans Pacific Ocean undersea communication fibers. Moreover, an effective core area that exceeds 130 $\mu m^2$ is difficult to manufacture.

In the present embodiment, it is possible to obtain dispersion slope of 0.12 ps/km/nm$^2$ or less in the used wavelength band. If the dispersion slope is in excess of 0.12 ps/km/nm$^2$, then the wavelength dependency of the chromatic dispersion value is large which is not suitable for application in a wavelength multiplex transmission system.

Note that it is possible to obtain a chromatic dispersion value in the used wavelength band within the range of −6 to +6 ps/km/nm. However, if the chromatic dispersion value is zero, then, because it is easy for four-wave mixing, which is one of the non-linear effects, to be generated, it is preferable if the used wavelength band is set so that it does not include a range where the chromatic dispersion value may become zero.

The bending loss is a value for the condition in which the bending diameter (2R) is 20 mm in the used wavelength band.

In the present embodiment, a bending loss of 100 dB/m or less and preferably of 40 dB/m or less is obtained. Moreover, essentially, a bending loss of 0.1 dB/m or more is obtained. If the bending loss in the used wavelength band exceeds 100 dB/m, this is not suitable as the transmission loss caused by the slight bending inflicted on the dispersion shifted optical fiber easily increased.

Further, because the dispersion shifted optical fiber of the present invention is a single mode optical fiber, the dispersion shifted optical fiber of the present embodiment needs to have a cutoff wavelength that essentially guarantees single mode propagation in the used wavelength band.

Normally, the cutoff wavelength is regulated by a value based on the CCITT 2 m method (referred to below as the 2 m method). However, in an actual state of long-haul use, single mode propagation is possible even if this value is on the long wavelength side of the minimum value of the used wavelength band.

Accordingly, in the dispersion shifted optical fiber of the present embodiment, the cutoff wavelength regulated by the 2 m method is set such that single mode propagation is possible in the used wavelength band and used length of the dispersion shifted optical fiber. Specifically, even if the cutoff wavelength according to the 2 m method is approximately 1.8 $\mu$m, for example, in an extended state above approximately 5000 m, it is possible to achieve sufficient single mode propagation in the above used wavelength band.

More preferably, it is desirable if the conditions below are satisfied in the above b and c.

b. $1.2 \leq r2/r1 \leq 1.9$ c. $\Delta 2 \geq 0.8\%$ and $1.8 \leq \Delta 2 \times (r2/r1)^2 \leq 3.2$ As a result, the effective core area is further increased and it is possible to obtain an effective core area of 85 to 130 $\mu m^2$.

More preferably, it is desirable if the conditions below are satisfied in the above b and c.

b. $1.2 \leq r2/r1 \leq 1.8$ c. $\Delta 2 \geq 0.8\%$ and $1.8 \leq \Delta 2 \times (r2/r1)^2 \leq 2.7$ As a result, the effective core area is further increased and it is possible to obtain an effective core area of 95 to 130 $\mu m^2$.

More preferably, in the above a, b, and d, it is desirable if r2/r1 is set to 1.3 or more and if Δ2 is set to 0% or less.

As a result, it is possible to obtain a dispersion slope of 0.10 ps/km/nm$^2$ or less.

The dispersion shifted optical fiber of the present embodiment, as described above, has a 3 layer structure including the cladding, and can be efficiently manufactured using the VAD method, for example.

In a dispersion shifted optical fiber having this type of comparatively simple refractive index profile, a dispersion shifted optical fiber such as that of the present embodiment that has both a large effective core area and a small dispersion slope, and also has a cut off wavelength and bending loss capable of being put to practical use as an optical transmission path has not been achieved in the conventional art. In particular, a substantial effect is achieved in the areas of an improvement in the efficiency with which the dispersion shifted optical fiber is manufactured, an improvement in the transmission characteristics of a wavelength multiplex transmission system and the like, and a reduction in costs.

(Second Embodiment)

The refractive index profile of the dispersion shifted optical fiber of the present embodiment is the same as that shown in FIG. 1.

In the dispersion shifted optical fiber of the present embodiment, in the above described used wavelength band, the effective core area is 45 to 70 $\mu m^2$, the chromatic dispersion value is −6 to +6 ps/km/nm, the dispersion slope is 0.05 to 0.08 ps/km/nm$^2$, the bending loss is 100 dB/m or less, and the cut off wavelength provides essentially single mode propagation.

In the present embodiment, if the effective core area is less than 45 $\mu m^2$, then the suppressing of the non-linear effect is insufficient. If the effective core area exceeds 70 $\mu m^2$ and the dispersion slope is 0.08 ps/km/nm$^2$ or less, then the manufacturing may prove to be difficult.

Further, in the present embodiment, if the dispersion slope in the used wavelength band exceeds 0.08 ps/km/nm$^2$, for example, in a large volume path with a large number of wavelength multiplexes, there are cases in which the reduction in the dispersion slope is insufficient. If the dispersion slope is less than 0.05 ps/km/nm$^2$, then the manufacturing stage may prove to be difficult.

Note that it is possible to obtain a chromatic dispersion value in the used wavelength band within the range of −6 to +6 ps/km/nm, however, in order to suppress the occurrence of the aforementioned four-wave mixing, it is more preferable that the used wavelength band is set so that the range where the chromatic dispersion value is zero is not included therein.

In the present embodiment, the bending loss is set to 100 dB/m or less and preferably to 40 dB/m or less so that worsening transmission loss is prevented.

Further, in the same way as in the first embodiment, the dispersion shifted optical fiber of the present embodiment in a state of actual use needs to have a cutoff wavelength that will essentially guarantee single mode propagation.

In order to satisfy such characteristics, in the refractive index profile shown in FIG. 1, Δ1 is selected from the range between −0.3 to +0.3%. If Δ1 is less than −0.3%, there is a tendency for the reduction in the dispersion slope to be insufficient, while if it exceeds +0.3%, there is a tendency for the enlargement of the effective core area to cause problems.

Δ2 is selected from a range of 0.8% or more. If it is less than 0.8%, the effect obtained by providing the peripheral core portion 2 is lost and there is a tendency for the enlargement of the effective core area to be difficult. Note that the value of the upper limit of Δ2 is not particularly restricted, but is taken as 2% for practical purposes.

Further, r2/r1 is selected from within the range 1.4 to 2.5. If it is less than 1.4, there is a tendency for the reduction in the dispersion slope to be insufficient. If it exceeds 2.5, there is a tendency for the enlargement of the effective core area to cause problems.

In addition, r2 is adjusted so that the chromatic dispersion value is a target value, and is essentially set between 2 to 10 $\mu$m. r3 is normally approximately 62.5 $\mu$m.

The dispersion shifted optical fiber of the present embodiment is a 3 layer structure including the cladding, in the same way as in the first embodiment. For example, it is possible for it to be manufactured efficiently according to the VAD method and the like. In particular, when the central core portion 1 and the cladding 6 are formed from pure quartz glass (i.e. when Δ1 is 0%), the operation to control the refractive index when manufacturing the mother material simply consists of doping germanium in the portion that will become the peripheral core portion 2 allowing the manufacturing efficiency to be greatly improved.

In a dispersion shifted optical fiber having this type of comparatively simple refractive index profile, a dispersion shifted optical fiber that has both a large effective core area and a small dispersion slope, and also has a cut off wavelength and bending loss capable of being put to practical use as an optical transmission path has not been achieved in the conventional art. A substantial effect is achieved in the areas of an improvement in the efficiency with which the dispersion shifted optical fiber is manufactured and a reduction in cost.

(Third Embodiment)

In the dispersion shifted optical fiber of the present embodiment, in the above described used wavelength band, the effective core area is 45 to 120 $\mu$m$^2$, the dispersion slope is 0.03 to 0.10 ps/km/nm$^2$, the bending loss is 100 dB/m or less, the chromatic dispersion absolute value is 0.5 to 8 ps/km/nm, and the cut off wavelength provides essentially single mode propagation.

Figure 3:
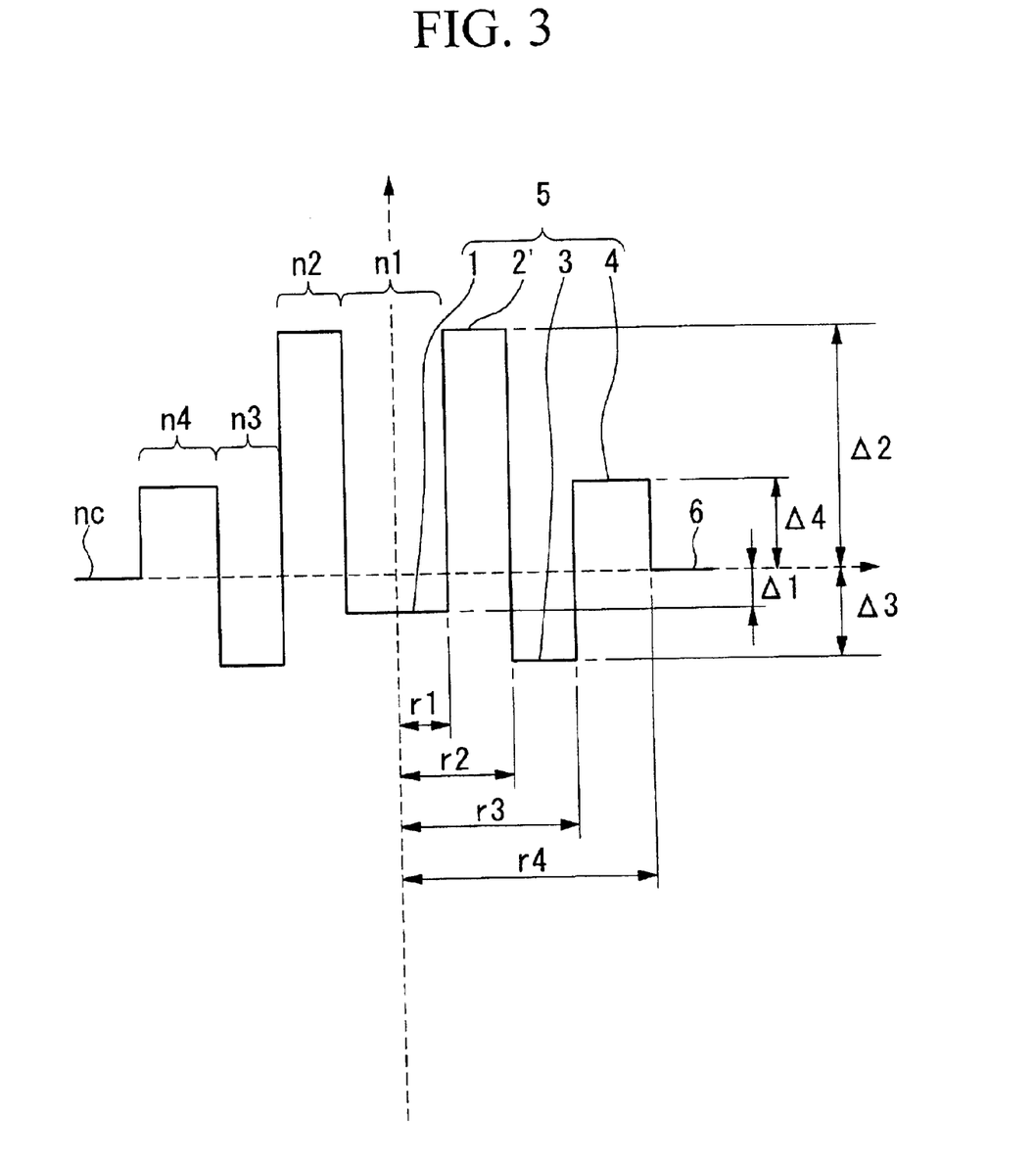
FIG. 3 is a view showing another example of the refractive index profile of the dispersion shifted optical fiber of the present invention.

FIG. 3 shows an example of a double O ring type of refractive index profile of the dispersion shifted optical fiber of the present embodiment. This refractive index profile comprises a core 5 and cladding 6 provided at the outer periphery of the core 5. The core 5 is formed in the following manner. Namely, the core 5 is provided with a central core portion 1 having a lower refractive index than the cladding 6 and a peripheral core portion (i.e. the first ring portion) 2' having a higher refractive index than the cladding 6 and provided at the outer periphery of the central core portion 1. A second ring portion 3 having a lower refractive index than the cladding 6 is provided at the outer periphery of the peripheral core portion 2' and a third ring portion 4 having a refractive index equal to or higher than the refractive index of the cladding 6 is provided at the outer periphery of the second ring portion 3.

In other words, the peripheral core portion 2' corresponds to the peripheral core portion 2 in the refractive index profile shown in FIG. 1. The refractive index profile shown in FIG. 3 has the second ring portion 3 and the third ring portion 4 provided between the peripheral core portion 2 and the cladding 6 in the refractive index profile shown in FIG. 1.

In this dispersion shifted optical fiber, for example, the central core portion 1 and the second ring portion 3 are formed from fluorine doped quartz glass to which fluorine which has the function of lowering the refractive index has been doped. The peripheral core portion 2' and the third ring portion 4 are formed from germanium doped quartz glass to which germanium which has the function of raising the refractive index has been doped, and the cladding 6 is formed from pure quartz glass.

Note that, in the actual refractive index profile of a dispersion shifted optical fiber, the boundaries of each layer (i.e. the central core portion 1, the peripheral core portion 2', the second ring portion 3, the third ring portion 4, and the cladding 6) may not be distinct as is shown in FIG. 3, but may be in a rounded state in which what is known as "sagging" is generated.

Moreover, Δ1 is the relative refractive index difference of the central core 1 when the refractive index of the cladding 6 is taken as the reference, while Δ2 is the relative refractive index difference of the peripheral core portion 2' when the refractive index of the cladding 6 is taken as the reference. Δ3 is the relative refractive index difference of the second ring portion 3 when the refractive index of the cladding 6 is taken as the reference, while Δ4 is the relative refractive index difference of the third ring portion 4 when the refractive index of the cladding 6 is taken as the reference.

In the present embodiment, Δ1 and Δ3 have a negative value, Δ2 has a positive value, while Δ4 is 0 or more. Namely, the refractive index n1 of the central core portion 1 and the refractive index n3 of the second ring portion 3 are set to smaller values than the refractive index nc of the cladding 6. The refractive index n2 of the peripheral core portion 2' is set to a larger value than the refractive index nc of the cladding 6, and the refractive index n4 of the third ring portion 4 is set to a value equal to or more than the refractive index nc of the cladding 6. Accordingly, when the refractive index n4 of the third ring portion 4 is equal to the refractive index nc of the cladding 6, essentially the third ring portion 4 does not exist in the refractive index profile, and the same refractive index profile as that shown in FIG. 1 is obtained.

Further, r1 is the radius of the central core portion 1, r2 is the radius of the peripheral core portion 2', r3 is the radius of the second ring portion 3, and r4 is the radius of the third ring portion 4.

In the present embodiment, if the effective core area in the used wavelength band is less than 45 $\mu$m$^2$, the suppression of the non-linear effect is insufficient. If the effective core area in the used wavelength band is more than 120 $\mu$m$^2$, the manufacturing process is difficult.

The smaller the dispersion slope in the used wavelength band the more preferable it is, as has been described above. In the present embodiment, the dispersion slope in the used wavelength band is set as 0.03 to 0.10 ps/km/nm$^2$. If it is in excess of 0.10 ps/km/nm$^2$, the chromatic dispersion value wavelength dependency increases and there are cases when this is not suitable for application in a wavelength multiplex transmission system. If it is less than 0.03 ps/km/nm$^2$, there are difficulties in the manufacturing.

The smaller the bending loss the better. In the present embodiment, from the standpoint of preventing transmission loss for worsening, the bending loss is kept to 100 dB/m or less and preferable to 50 dB/m or less.

In the present embodiment, the chromatic dispersion absolute value in the wavelength band that is set in a range between 0.5 to 8 ps/km/nm. Namely, the chromatic dispersion value of the dispersion shifted optical fiber of the present embodiment can be set as a positive value and can also be set as a negative value. If the value is less than 0.5 ps/km/nm, the chromatic dispersion value becomes close to zero and it is easy for four-wave mixing, which is one of the non-linear effects, to occur. If it is in excess of 8 ps/km/nm, the deterioration in the transmission characteristics may become somewhat too large.

In the same way as in the first embodiment, the dispersion shifted optical fiber of the present embodiment needs to have a cutoff wavelength that guarantees single mode propagation in the actual state of use.

The structure required to satisfy such characteristics are described below together with the details of the examination.

Figure 4:
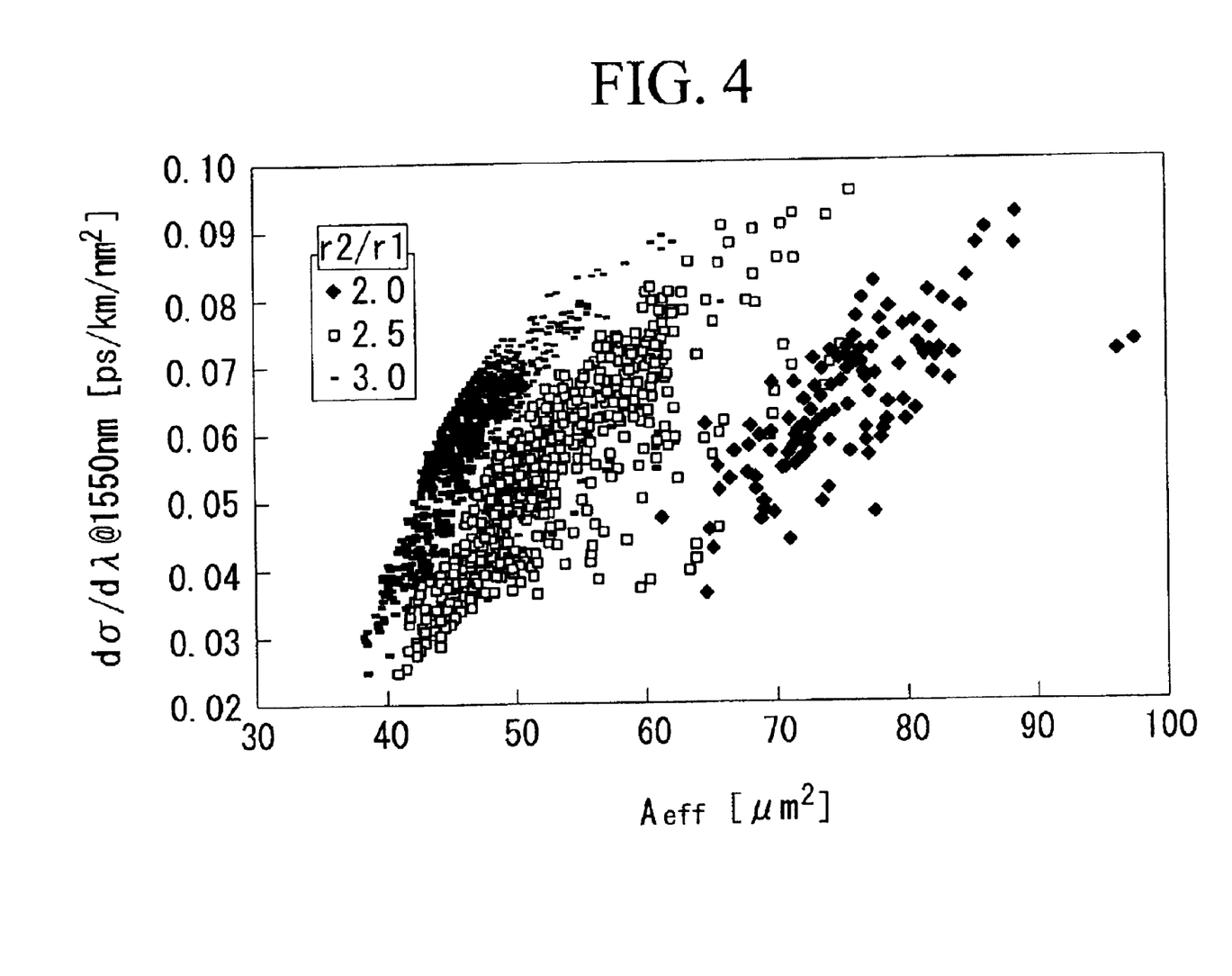
FIG. 4 is a graph showing the results of analysis of values of characteristics obtained by setting various structural parameters in the third embodiment.

FIG. 4 shows the results of analysis of the characteristic values obtained by setting various structural parameters. Note that a is the chromatic dispersion value and dσ/dλ is the dispersion slope.

From this diagram it can be seen that, the smaller r2/r1 is set, the greater the tendency is for the effective core area to increase. Accordingly, from the viewpoint of the increase in the effective core area, it is preferable if r2/r1 is set so as to be 2.5 or less.

If, however, r2/r1 is too small, the chromatic dispersion absolute value tends to increase, therefore, in order to obtain a chromatic dispersion value that is suitable for the dispersion shifted optical fiber of the present invention, it is preferable if r2/r1 is set so as to be 1.3 or more.

It is also preferable from the results of the analysis that $\Delta 2$ be set in the range of 0.65 to 0.85%. If $\Delta 2$ is too large, then both the increase of the effective core area and the reduction in the dispersion slope are difficult to obtain. If $\Delta 2$ is too small, then it is not possible to obtain the desired chromatic dispersion value.

The structural parameters ($\Delta 3$, r3) of the second ring portion 3 are limited by the values set for the effective core area and the dispersion slope. The structural parameters ($\Delta 4$, r4) of the third ring portion 4 are limited by the values set for the cutoff wavelength and the dispersion slope.

It is also possible to set the chromatic dispersion value as either a positive or negative value using the values set for the above structural parameters, and adjustment that is appropriate to the requirements of the optical communication system in which the dispersion shifted optical fiber is being applied becomes possible.

As a result of such analysis, it was understood that the restrictions on the structural parameters for the desired characteristics differ depending on whether the chromatic dispersion value is set as a positive value or as a negative value.

For example, if the chromatic dispersion value is set to a negative value when an effective core area of 50 to 75 $\mu m^2$ and a dispersion slope of 0.03 to 0.06 ps/km/nm² are desired, then it is necessary to satisfy the conditions of the following structural parameters: $-0.50\% \leq \Delta 1 \leq -0.25\%$, $0.65\% \leq \Delta 2 \leq 0.85\%$, $-0.50\% \leq \Delta 3 \leq -0.25\%$, $0.0\% \leq \Delta 4 \leq 0.30\%$, $1.5 \leq r2/r1 \leq 2.5$, $1.5 \leq (r3-r2)/r1 \leq 2.5$, $0.5 \leq (r4-r3)/r2 \leq 2.0$.

In the same characteristics, if the chromatic dispersion value is set to a positive value, then it is necessary to satisfy the conditions of the following structural parameters; $-0.5\% \leq \Delta 1 \leq -0.05\%$, $0.75\% \leq \Delta 2 \leq 0.85\%$, $-0.50\% \leq \Delta 3 \leq -0.15\%$, $0.0\% \leq \Delta 4 \leq 0.3\%$, $1.5 \leq r2/r1 \leq 2.5$, $1.5 \leq (r3-r2)/r1 \leq 2.5$, $0.5 \leq (r4-r3)/r2 \leq 2.0$.

If the chromatic dispersion value is set to a negative value when an effective core area of 75 to 100 $\mu m^2$ and a dispersion slope of 0.06 to 0.09 ps/km/nm² are desired, then it is necessary to satisfy the conditions of the following structural parameters: $-0.50\% \leq \Delta 1 - 0.20\%$, $0.65\% \leq \Delta 2 \leq 0.85\%$, $-0.50\% \leq \Delta 3 \leq -0.25\%$, $0.0\% \leq \Delta 4 \leq 0.30\%$, $1.3 \leq r2/r1 \leq 2.5$, $0.5 \leq (r3-r2)/r1 \leq 1.5$, $0.5 \leq (r4-r3)/r2 \leq 2.0$.

In the same characteristics, if the chromatic dispersion value is set to a positive value, then it is necessary to satisfy the conditions of the following structural parameters: $-0.50\% \leq \Delta 1 \leq -0.05\%$, $0.65\% \leq \Delta 2 \leq 0.85\%$, $-0.50\% \leq \Delta 3 \leq -0.15\%$, $0.0\% \leq \Delta 4 \leq 0.30\%$, $1.3 \leq r2/r1 \leq 3.0$, $0.5 \leq (r3-r2)/r1 \leq 2.5$, $0.5 \leq (r4-r3)/r2 \leq 2.0$.

Further, if the chromatic dispersion value is set to a positive value when an effective core area of 100 to 120 $\mu m^2$ and a dispersion slope of 0.08 to 0.10 ps/km/nm² are desired, then it is necessary to satisfy the conditions of the following structural parameters: $-0.50\% \leq \Delta 1 \leq -0.25\%$, $0.65\% \leq \Delta 2 \leq 0.75\%$, $-0.50\% \leq \Delta 3 \leq -0.25\%$, $0.0\% \leq \Delta 4 \leq 0.30\%$, $1.3 \leq r2/r1 \leq 2.5$, $0.5 \leq (r3-r2)/r1 \leq 1.5$, $0.5 \leq (r4-r3)/r2 \leq 2.0$.

Note that, in these embodiments, the values of the preferable effective core area, chromatic dispersion value, dispersion slope, bending loss, and cutoff wavelength are not able to be achieved by arbitrarily selection from a preferable range of numbers of the structural parameters given as examples in the respective embodiments. In other words, in each of the above embodiments, by selecting an appropriate combination that is able to provide the required characteristics from combinations of structural parameters selected from the shown preferable ranges of numbers, it has become possible for the first time to obtain a dispersion shifted optical fiber having the above preferable characteristic values.

Accordingly, in the present invention, because it is difficult to specify the invention using the refractive index profile and the number range of the structural parameters, the invention is specified using the refractive index profile and the characteristic values.

EXAMPLES

The present invention will now be described in detail using examples.

A. Examples Pertaining to the First Embodiment

Examples 1-1 to 1-3

The dispersion shifted optical fibers of Examples 1-1 to 1-3 were manufactured in accordance with VAD method under the conditions shown in Table 1.

Note that in Examples 1-1 to 1-3, the central core portions are formed from fluorine doped quartz glass, the peripheral core portions are formed from germanium doped quartz glass, and the cladding is formed from pure quartz glass.

In addition, the outer diameters of the dispersion shifted optical fibers (i.e. the outer diameter of the cladding) are set at 125 $\mu m$. The characteristic values in the 1550 nm wavelength of the dispersion shifted optical fibers are shown together in Table 1.

TABLE 1

|  | Example 1-1 | Example 1-2 | Example 1-3 |
|---|---|---|---|
| Δ1 (%) | −0.675 | −0.40 | −0.15 |
| Δ2 (%) | 1.00 | 1.05 | 1.70 |
| r2/r1 | 1.80 | 1.50 | 1.20 |
| r2 (μm) | 3.29 | 3.73 | 3.91 |
| Ring outer volume/ring inner volume | 2.7 | 2.5 | 3.7 |
| λc (μm) | 1.432 | 1.551 | 1.601 |
| Aeff (μm$^2$) | 83.18 | 100.15 | 115.20 |
| Chromatic dispersion (ps/km/nm) | −1.5 | −1.2 | 0.6 |
| Dispersion slope (ps/km/nm$^2$) | 0.0861 | 0.0931 | 0.1015 |
| Bending loss (dB/m [20φ]) | 17.4 | 18.0 | 29.5 |
| Rayleigh loss (dB/km) | 0.196 | 0.196 | 0.195 |

As is shown in Table 1, each of the effective core area, the chromatic dispersion value, the dispersion slope, the bending loss, and the cutoff wavelength (λc) were able to provide the characteristics of the dispersion shifted optical fiber of the present invention. Namely, a dispersion shifted optical fibers were obtained that: had bending losses that could be put to practical use in an actual optical communication system; could guarantee single mode propagation; could reduce any deterioration in the transmission loss by suppressing non-linear effects due to the large size of the effective core area; and that provides a low dispersion slopes that could be applied in a wavelength multiplex transmission system preferably.

B. Examples Pertaining to the Second Embodiment

Examples 2-1 to 2-3

The dispersion shifted optical fibers of Examples 2-1 to 2-3 were manufactured in accordance with VAD method under the conditions shown in Table 2.

Note that in Examples 2-1 to 2-3, the peripheral core portions are formed from germanium doped quartz glass, and the cladding is formed from pure quartz glass. In Example 2-1, the central core portion is formed from fluorine doped quartz glass, in Example 2-2, the central core portion is formed from pure quartz glass, and in Example 2-3, the central core portion is formed from germanium doped quartz glass. In addition, the outer diameters of the dispersion shifted optical fibers (i.e. the outer diameter of the cladding) are set at 125 μm. The characteristic values in the 1550 nm wavelength of the dispersion shifted optical fibers are shown together in Table 2.

A combination of various structural parameters were set and the characteristics of the dispersion shifted optical fibers that were actually trial manufactured in accordance with CVD method were shown.

Note that the symbol λc in the table denotes cutoff wavelength, MFD denotes mode field diameter, and αb@20φ denotes bending loss.

It is clear from Table 3 that, in the 1550 nm wavelength that was used, a dispersion shifted optical fiber is provided that is essentially single mode and is capable of fulfilling the condition of a bending loss of 100 dB/m or less, and that also provides a sufficient increase in the effective core area and a sufficient reduction in the dispersion slope.

INDUSTRIAL APPLICABILITY

As described above, a dispersion shifted optical fiber is provided that is essentially single mode and is capable of fulfilling the condition of a bending loss of 100 dB/m or less, and that also provides a sufficient increase in the effective core area and a sufficient reduction in the dispersion slope. Accordingly, the optimum dispersion shifted optical fiber for a wavelength multiplex transmission system in particular can be provided.

Moreover, it is only necessary to provide at least the central core portion, the peripheral core portion, and the cladding, giving a dispersion shifted optical fiber having a comparatively simple refractive index profile. Accordingly, efficient manufacturing using the VAD method or the like, for example, becomes possible. The manufacturing efficiency of a 3 layer structure dispersion shifted optical fiber is particularly high.

In addition, excellent effects are obtained in the improvement in the manufacturing efficiency of a dispersion shifted optical fiber, the improvement in the transmission characteristics in a wavelength multiplex transmission system and the like, and in the reduction of costs.

Further, because it is possible to set the chromatic dispersion value to either a positive or negative value using the values set for the structural parameters, it is possible to flexibly match the dispersion shifted optical fiber to the requirements of the optical communication system in which it is used.

What is claimed is:

1. A dispersion shifted optical fiber comprising a core and cladding provided at an outer periphery of the core, and having a refractive index profile in which the core is provided with a central core portion and a peripheral core portion having a higher refractive index

TABLE 2

|  | Δ1 (%) | Δ2 (%) | r2/r1 | λc (μm) | Aeff (μm$^2$) | Bending loss (dB/m [20φ]) | Dispersion slope (ps/km/nm$^2$) | Chromatic dispersion (ps/km/nm) |
|---|---|---|---|---|---|---|---|---|
| Example 2-1 | −0.20 | 1.42 | 1.50 | 1.13 | 58.8 | 18.2 | 0.078 | −0.8 |
| Example 2-2 | 0.00 | 1.10 | 1.75 | 1.01 | 51.4 | 19.6 | 0.066 | 1.0 |
| Example 2-3 | 0.20 | 0.90 | 2.00 | 0.96 | 47.6 | 15.2 | 0.061 | −1.6 |

As is shown in Table 2, each of the effective core area, the chromatic dispersion value, the dispersion slope, the bending loss, and the cutoff wavelength (λc) are able to provide the characteristics of the dispersion shifted optical fiber of the present invention.

C. Examples Pertaining to the Third Embodiment

Various dispersion shifted optical fibers according to the third embodiment were manufactured.

than the central core portion provided at an outer periphery of the central core portion, and the cladding has a lower refractive index than the peripheral core portion, wherein, in a used wavelength band selected from 1490 to 1625 nm, the dispersion shifted optical fiber has an effective core area of 75 to 130 μm$^2$, a chromatic dispersion value of −6 to +6 ps/km/nm, a dispersion slope of 0.12 ps/km/nm² or less, a bending loss of 100 dB/m or less, and a cutoff wavelength that provides essentially single mode propagation wherein a core comprises a central core portion and a peripheral core portion and if $\Delta 1$ is a relative refractive index difference of the central core when the refractive index of the cladding is taken as a reference, and $\Delta 2$ is a relative refractive index difference of the peripheral core portion when the refractive index of the cladding is taken as the reference, and r1 is a radius of the central core portion and r2 is a radius of the peripheral core portion, then the following conditions a to d are fulfilled:

a. $1.35\% \leq (\Delta 2 - \Delta 1)$
b. $1.2 \leq r2/r1 \leq 2.0$
c. $\Delta 2 \geq 0.8\%$ and $1.8 \leq \Delta 2 \times (r2/r1)^2 \leq 3.5$
d. When the larger one from out of 0.8 or $1.8/(r2/r1)^2$ is set as $\Delta 2$ min, and a ring inner volume is set as $\Delta 1 \times r1^2$, and a ring outer volume is set as $\Delta 2$ min $\times (r2^2 - r1^2)$, then the ring outer volume/ring inner volume is either 2 or more, or 0 or less.

2. The dispersion shifted optical fiber according to claim 1, wherein b and c are within the numerical ranges given below:

b: $1.2 \leq r2/r1 \leq 1.8$
c: $\Delta 2 \geq 0.8\%$ and $1.8 \leq \Delta 2 \times (r2/r1)^2 \leq 2.7$ wherein the effective core area is 95 to 130 $\mu m^2$.

3. The dispersion shifted optical fiber according to claim 1, wherein r2/r1 is 1.3 or more and $\Delta 1$ is 0% or less wherein the dispersion slope is 0.10 ps/km/nm² or less.

4. The dispersion shifted optical fiber according to claim 1, wherein the core comprises a central core portion and a peripheral core portion, and in a used wavelength band selected from 1490 to 1625 nm, the dispersion shifted optical fiber has an effective core area of 45 to 70 $\mu m^2$, a chromatic dispersion value of −6 to +6 ps/km/nm, a dispersion slope of 0.05 to 0.08 ps/km/nm² or less, a bending loss of 100 dB/m or less, and a cutoff wavelength that provides essentially single mode propagation, wherein, if $\Delta 1$ is a relative refractive index difference of the central core when the refractive index of the cladding is taken as a reference, and $\Delta 2$ is a relative refractive index difference of the peripheral core portion when the refractive index of the cladding is taken as the reference, and r1 is a radius of the central core portion and r2 is a radius of the peripheral core portion, then $\Delta 1$ is −0.3 to +0.3%, $\Delta 2$ is 0.8% or more, and r2/r1 is 1.4 to 2.5.

5. The dispersion shifted optical fiber according to claim 1, wherein the core comprises a central core portion and a peripheral core portion, and in a used wavelength band selected from 1490 to 1625 nm, the dispersion shifted optical fiber has an effective core area of 45 to 70 $\mu m^2$, a chromatic dispersion value of −6 to +6 ps/km/nm, a dispersion slope of 0.05 to 0.08 ps/km/nm² or less, a bending loss of 100 dB/m or less, and a cutoff wavelength that provides essentially single mode propagation, wherein $\Delta 1$ is 0%.

6. A dispersion shifted optical fiber comprising a core and cladding provided at an outer periphery of the core, and having a refractive index profile in which the core is provided with a central core portion and a peripheral core portion having a higher refractive index than the central core portion provided at an outer periphery of the central core portion, and the cladding has a lower refractive index than the peripheral core portion, wherein the core comprises a peripheral core portion, a second ring portion, and a third ring portion provided in that order on the central core portion and when the relative refractive index difference and radius of the central core portion, the peripheral core portion, the second ring portion, and the third core portion are set respectively as ($\Delta 1$, r1), ($\Delta 2$, r2), ($\Delta 3$, r3), and ($\Delta 4$, r4) when the cladding is taken as a reference, then the dispersion shifted optical fiber has a refractive index profile in which $\Delta 1$ and $\Delta 3$ are set as negative values, $\Delta 2$ is set as a positive value, and $\Delta 4$ is set as 0 or more, and in a used wavelength band selected from 1490 to 1625 nm, the dispersion shifted optical fiber has an effective core area of 50 to 75 $\mu m^2$, a dispersion slope of 0.03 to 0.06 ps/km/nm², a chromatic dispersion value of 0.5 to 8 ps/km/nm, a bending loss of 100 dB/m or less, and a cutoff wavelength that provides essentially single mode propagation.

7. The dispersion shifted optical fiber according to claim 6, wherein the chromatic dispersion value is a negative value and $-0.50\% \leq \Delta 1 \leq -0.25\%$, $0.65\% \leq \Delta 2 \leq 0.85\%$, $-0.50\% \leq \Delta 3 \leq -0.25\%$, $0.0\% \leq \Delta 4 \leq 0.30\%$, $1.5 \leq r2/r1 \leq 2.5$, $1.5 \leq (r3-r2)/r1 \leq 2.5$, $0.5 \leq (r4-r3)/r2 \leq 2.0$.

8. The dispersion shifted optical fiber according to claim 6, wherein the chromatic dispersion value is a positive value and $-0.5\% \leq \Delta 1 \leq -0.05\%$, $0.75\% \leq \Delta 2 \leq 0.85\%$, $-0.50\% \leq \Delta 3 \leq -0.15\%$, $0.0\% \leq \Delta 4 \leq 0.3\%$, $1.5 \leq r2/r1 \leq 2.5$ $1.5 \leq (r3-r2)/r1 \leq 2.5$ $0.5 \leq (r4-r3)/r2 \leq 2.0$.

9. A dispersion shifted optical fiber comprising a core and cladding provided at an outer periphery of the core, and having a refractive index profile in which the core is provided with a central core portion and a peripheral core portion having a higher refractive index than the central core portion provided at an outer periphery of the central core portion, and the cladding has a lower refractive index than the peripheral core portion, wherein the core comprises a peripheral core portion, a second ring portion, and a third ring portion provided in that order on the central core portion and when the relative refractive index difference and radius of the central core portion, the peripheral core portion, the second ring portion, and the third core portion are set respectively as ($\Delta 1$, r1), ($\Delta 2$, r2), ($\Delta 3$, r3), and ($\Delta 4$, r4) when the cladding is taken as a reference, then the dispersion shifted optical fiber has a refractive index profile in which $\Delta 1$ and $\Delta 3$ are set as negative values, $\Delta 2$ is set as a positive value, and $\Delta 4$ is set as 0 or more, and in a used wavelength band selected from 1490 to 1625 nm, the dispersion shifted optical fiber has an effective core area of 75 to 100 $\mu m^2$, a dispersion slope of 0.06 to 0.09 ps/km/nm², a chromatic dispersion value of −8 to +8 ps/km/nm, a bending loss of 100 dB/m or less, and a cutoff wavelength that provides essentially single mode propagation, wherein the chromatic dispersion value is a negative value and $-0.50\% \leq \Delta 1 \leq -0.20\%$, $0.65\% \leq \Delta 2 \leq 0.85\%$, $-0.50\% \leq \Delta 3 \leq -0.25\%$, $0.0\% \leq \Delta 4 \leq 0.30\%$, $1.3 \leq r2/r1 \leq 2.5$, $0.5 \leq (r3-r2)/r1 \leq 5, 0.5 \leq (r4-r3)/r2 \leq 2.0$.

10. A dispersion shifted optical fiber comprising a core and cladding provided at an outer periphery of the core, and having a refractive index profile in which the core is provided with a central core portion and a peripheral core portion having a higher refractive index than the central core portion provided at an outer periphery of the central core portion, and the cladding has a lower refractive index than the peripheral core portion, wherein the core comprises a peripheral core portion, a second ring portion, and a third ring portion provided in that order on the central core portion and when the relative refractive index difference and radius of the central core portion, the peripheral core portion, the second ring portion, and the third core portion are set respectively as (Δ1, r1), (Δ2, r2), (Δ3, r3), and (Δ4, r4) when the cladding is taken as a reference, then the dispersion shifted optical fiber has a refractive index profile in which Δ1 and Δ3 are set as negative values, Δ2 is set as a positive value, and Δ4 is set as 0 or more, and in a used wavelength band selected from 1490 to 1625 nm, the dispersion shifted optical fiber has an effective core area of 75 to 100 $\mu$m$^2$, a dispersion slope of 0.06 to 0.09 ps/km/nm$^2$, a chromatic dispersion value of −8 to +8 ps/km/nm, a bending loss of 100 dB/m or less, and a cutoff wavelength that provides essentially single mode propagation, wherein the chromatic dispersion value is a positive value and −0.50% ≦ Δ1 ≦ −0.05%, 0.65% ≦ Δ2 ≦ 0.85%, −0.50% ≦ Δ3 ≦ −0.15%, 0.0% ≦ Δ4 ≦ 0.30%, 1.3 ≦ r2/r1 ≦ 3.0, 0.5 ≦ (r3−r2)/r1 ≦ 2.5, 0.5 ≦ (r4−r3)/r2 ≦ 2.0.

11. A dispersion shifted optical fiber comprising a core and cladding provided at an outer periphery of the core, and having a refractive index profile in which the core is provided with a central core portion and a peripheral core portion having a higher refractive index than the central core portion provided at an outer periphery of the central core portion, and the cladding has a lower refractive index than the peripheral core portion, wherein the core comprises a peripheral core portion, a second ring portion, and a third ring portion provided in that order on the central core portion and when the relative refractive index difference and radius of the central core portion, the peripheral core portion, the second ring portion, and the third core portion are set respectively as (Δ1, r1), (Δ2, r2), (Δ3, r3), and (Δ4, r4) when the cladding is taken as a reference, then the dispersion shifted optical fiber has a refractive index profile in which Δ1 and Δ3 are set as negative values, Δ2 is set as a positive value, and Δ4 is set as 0 or more, and in a used wavelength band selected from 1490 to 1625 nm, the dispersion shifted optical fiber has an effective core area of 100 to 120 $\mu$m$^2$, a dispersion slope of 0.08 to 0.10 ps/km/nm$^2$, a chromatic dispersion value of 0.5 to 8 ps/km/nm, a bending loss of 100 db/m or less, and a cutoff wavelength that provides essentially single mode propagation, wherein the chromatic dispersion value is a positive value and −0.50% ≦ Δ1 ≦ −0.25%, 0.65% ≦ Δ2 ≦ 0.75% −0.50% ≦ Δ3 ≦ −0.25%, 0.0% ≦ Δ4 ≦ 0.30%, 1.3 ≦ r2/r1 ≦ 2.5, 0.5 ≦ (r3−r2) ≦ 1.5, 0.5 ≦ (r4−r3)/r2 ≦ 2.0.

* * * * *